May 8, 1962 E. G. SWICK 3,034,027

TRIMMER CAPACITORS

Filed Feb. 15, 1960

INVENTOR.
Edwin Grant Swick
BY Jack R. Halvorsen 3,034,027
TRIMMER CAPACITORS
Edwin Grant Swick, Bartlett, Ill., assignor to Illinois Tool Works Inc., Chicago, Ill., a corporation of Delaware
Filed Feb. 15, 1960, Ser. No. 8,634
3 Claims. (Cl. 317—249)

This invention relates to capacitors generally and more particularly to a small trimming capacitor.

In the fields of radio and television great quantities of trimming capacitors are utilized to provide small and accurate variations in frequencies in the circuitry of the set in which they are found. It is not uncommon in this art to utilize a dielectric member which is internally threaded for the acceptance of a metallic threaded body, the threaded element serving as one electrode or plate of the capacitor. The second plate or electrode may consist of a metallic sleeve encircling the exterior of the aforesaid dielectric member. Accurate axial adjustment of the screw relative to the dielectric member and metallic sleeve results in varying the value of the capacitance of the trimmer to the desired setting.

With the advent of the printed circuit board, it was evident that new means of mounting devices such as trimmers must be devised. It is apparent that electrical contact must be accomplished with the circuit board by both the sleeve and the adjustable screw, but independently of each other. In the past, it has been necessary to provide one or more soldered connections using wires to interconnect the circuitry with the screw and the outer electrode. This resulted in multiplicity of parts as well as a difficult and expensive assembly operation. In addition to overcoming such problems, the electronic devices wherein advantages secured from the use of printed circuits demand that, to accomplish compactness, a major portion of the elements or components must be mounted thereon in a vertical position relative to the printed circuit board. This assures lateral compactness of the package as a whole.

Therefore, an object of the present invention is to provide a trimmer which is capable of minute adjustment to afford the user accurate settings for the frequencies within the desired band.

Another object of the present invention is to provide a trimmer which is economical to fabricate and which utilizes a minimum number of parts.

A further object of the invention is to provide a trimmer having the above characteristics which is capable of being mounted perpendicularly relative to the work panel and which, because of its construction, is easy to install and remove from one side of the panel and will by reason of its design permit adjustments of the threaded member to desired settings of capacitance.

The foregoing and other objects and advantages of the invention will become readily apparent upon reading of the specification in conjunction with the accompanying drawing wherein.

Figure 1:
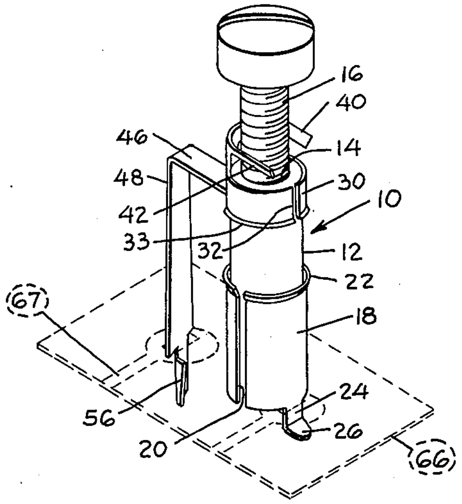
FIG. 1 is a perspective view of an embodiment of the present invention.

Referring now to the drawing, a preferred embodiment of the present invention is a capacitor assembly 10. The capacitor assembly 10 includes an elongated dielectric member 12, as disclosed, being a ceramic tube 12 which is internally threaded (not shown) throughout the entire length of its bore 14. Adjustably mounted within threaded bore 14 is a metallic threaded body or screw 16. This member 16 serves as the inner plate or electrode for the capacitor and preferably extends outwardly beyond the upper end of the ceramic tube 12, as viewed in the drawings.

Embracing the opposite end of the ceramic tube is a split metallic sleeve 18, said sleeve serving as the second electrode or plate of the capacitor. In the present instance the sleeve 18 is split as at 20 throughout its length and is manufactured of a spring material so that it may be so formed as to aggressively embrace the exterior of the ceramic tube. It is shown flared at one end, as at 22, so as to facilitate the initial assembly with the ceramic tube 12. Extending downwardly from the opposite or other end of sleeve 18 is a tab or flange 24, which has its extremity deformed outwardly, as at 26, to provide a toe-like or hook element. The important purpose of this element will be more adequately described hereafter.

Mounted on the opposite end of tube 12 is a second metallic sleeve element 30. Sleeve 30, similarly to sleeve 18, is a split body (shown at 32) and is made of spring material so that it too may be formed to aggressively embrace the tube 12. Obviously, its normal or initial formed diameter is slightly less than the outer diameter of 12 and as it is mounted on ceramic member 12 it is radially expanded.

To accomplish such assembly the sleeve 30 is preferably flared at its lower end as indicated at 33. Extending upwardly from the upper margin of sleeve 30 (see FIGS. 1 and 2) is a tab 34, integral with sleeve 30. Extending from the free end of sleeve 30 is integral contact element 36. Contact element 36 (as shown) is generally U-shaped when viewed in the plan and includes a bight portion 38 and a pair of laterally extending arms 40 and 42. The arms 40 and 42 are twisted or deformed relative to each other presenting lower margins extending inwardly and in opposition to the other for accomplishing gripping engagement with the threads of the screw 16. The arms 40 and 42 are initially or normally spaced apart a distance less than the diameter of the screw whereby they must be spread as an incident to mounting of the screw therebetween.

The cam surfaces presented by arms 40 and 42 in their twisted condition present feed in cam surfaces to facilitate initial mounting of the screw in the assembly.

Extending outwardly from sleeve 30 on the same side as the flange 34 is an L-shaped arm or contact brace 50 including flange 46 which extends outwardly a substantial distance and a downwardly extending portion 48. Arm 50 extends downwardly to a point where it intersects a plane passing substantially through the bottom of sleeve 18 and ceramic tube 12. At this point the leg 48 is so formed as to provide a pair of downwardly facing shoulders 54. A stud portion 56 is provided on the free end of arm 50 and has an axial extent at least equal to the material thickness of the work panel with which the assembly is to be associated. Fastener 56 may be of any form which presents a shoulder or shoulders which will underlie the panel and cooperate with shoulders 54 to grippingly engage the panel 66 therebetween. As shown, the stud form is substantially Z-shaped in plan section and has shoulders 58 and 60 to cooperate in mounting of the capacitor assembly in the aforedescribed manner.

The sleeves 30 and 18 are mounted on the dielectric body by slipping the expansible sleeves 18 and 30 over the opposite respective ends of ceramic tube 12. Thereafter, screw 16 is fed in between arms 40 and 42 into engagement with the threaded bore 14 to complete the assembly. The assembly is now ready for mounting on a printed circuit board, or the like.

Figure 2:
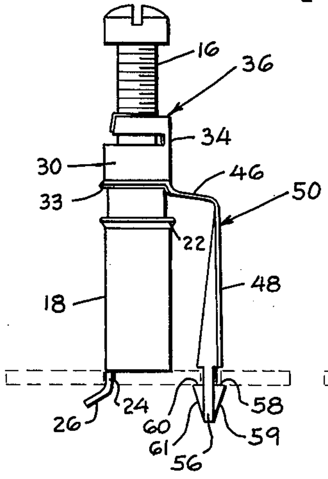
FIG. 2 is an elevation from one side of the same embodiment of the invention.
Figure 3:
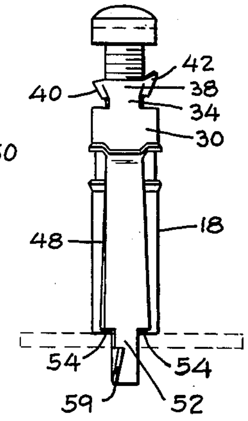
FIG. 3 is an elevation taken from the backside of the same embodiment of the present invention.
Figure 4:
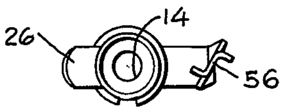
FIG. 4 is a bottom view of the embodiment shown in FIGS. 1 through 3.

The trimmer is ideally adapted for use with a printed circuit board 66, which is shown in phantom in FIGS. 1 through 3 for purposes of clarity of illustration. Board 66 generally has superimposed on the lower surface thereof a developed circuitry 67 with specific provision being made for the acceptance of the trimmer assembly 10.

Figure 5:
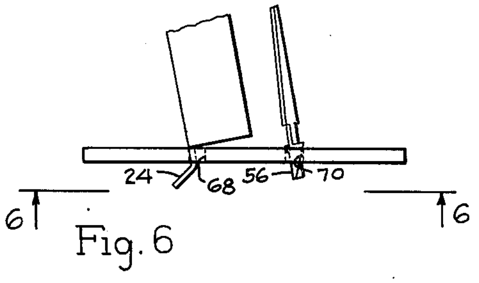
FIG. 5 is a partial view of the same embodiment showing it being applied to a work panel.
Figure 6:
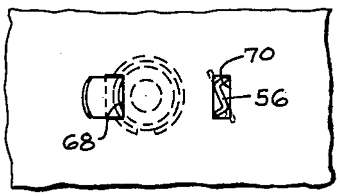
FIG. 6 is a view taken along line 6—6 in FIG. 5.

As best seen in FIGS. 5 and 6, the board is prepared for mounting of the instant capacitor with a pair of spaced rectangular openings 68 and 70 respectively. The mounting of the trimmer on the work panel is accomplished by tipping the trimmer slightly forward as viewed in FIG. 5 with the free end portion of tab 24 being fed through aperture 68 and causing it to engage the far edge of the aperture. Arrowhead fastener 56 is then inserted into aperture 70 by the tipping of the trimmer back to a normal upright or vertical position. As best seen in FIG. 6, the cam surfaces which lead up to the oppositely directed shoulders 58 and 60 will twist the downwardly directed portion 48 in an opposite direction from its normal position, until such time as the shoulders 58 and 60 pass through aperture 70. At this point arm 48 snaps back to its initial position and aggressively urges shoulders 58 and 60 to underlie the panel 66. The aperture 70 should be of adequate dimension to accept the arrowhead fastener 56, but small enough to present opposed edge portions to cooperate with shoulders 54 of arm 48. This insures a tight fit, positive mounted assembly, and further provides lateral stability to the trimmer as a unit. In the final installed position (as seen in FIGS. 1 through 3) the lower edge of sleeve 18, the base of ceramic tube 12 and shoulders 54 rest upon the top surface of the workpiece 66, while the hook shaped member 26 and the arrowhead fastener 56 underlie the panel thereby cooperatively securing the assembly in position. With the printed circuit being on the bottom surface of the panel 66, elements 26 and 56 make electrical contact with the circuit and are thereafter adaptable to be subject to a dipsoldering process (if desired) to assure electrical connection. This soldering also adds to the overall mechanical stability of the part in its assembled position.

The U-shaped contact element 38, with its inwardly directed arms 40 and 42 embracing the screw 16, provides an excellent electrical contact with screw 16. Because of the spring nature of arms 40 and 42, they aggressively impinge upon the thread of screw 16 and provide a prevailing torque on said screw. This eliminates unintentional rotation of the screw within the ceramic tube 12 due to vibration or other means and insures the user of accurate frequency settings previously accomplished.

It is apparent from the above that the present invention contemplates a relatively simple device having a minimum number of parts which can be economically fabricated and assembled. Further, the invention suggests a device providing, in mounted position, a high degree of accessibility from the upper surface of the circuit board where the tubes and other elements, such as transistors, will be located. It is mechanically stable relative to its mounting on the workpiece and provides a high degree of accuracy in the various settings of capacitance for which it is designed, and which in turn will accomplish control of the frequency of the circuit with which it is associated. While only the preferred embodiment of the invention has been disclosed, other variations will be apparent to those skilled in the art and it is intended that I be limited only by the appended claims.

I claim:

1. A trimmer capacitor assembly adapted to be accepted in a printed circuit board having at least two apertures including a cylindrical dielectric member having an axially extending threaded bore, a metallic screw adapted to be adjustably accepted by said bore and extending outwardly beyond one end of said member, a pair of split metallic cylindrical sleeves coaxially embracing said dielectric member, said sleeves positioned in spaced-apart relationship at opposite ends of said member, a tab attached to one of said sleeves and extending downwardly and outwardly away from said member and adapted to extend through one aperture in said board and engage the undersurface thereof, an L-shaped means having two legs, the first leg being attached to and extending laterally from the second of said sleeves, the second leg extending substantially parallel to the axis of said sleeves and said member, an arrow-shaped fastening means which is substantially Z-shaped in section affixed to the free end of said second leg and having oppositely extending shoulder means adapted to extend through a second aperture in said board and engage the underside of said board, said second leg being twisted about its axis to aggressively urge said shoulder means into underlying engagement with the undersurface of said board, means for electrically interconnecting said second sleeve with said screw including an axially extending flange and a pair of flat arms extending inwardly from opposite edges of said flange and adapted to embrace the shank portion of said screw extending outwardly beyond said dielectric member, said arms being twisted about their axis to present an edge for engagement with the thread of said screw, said arms being of spring material and spaced apart a distance less than the minor diameter of said screw whereby they create a prevailing torque on said screw.

2. A trimmer capacitor adapted to be mounted on one side of an apertured work panel in a perpendicular position including an elongated dielectric means having an axial bore through a portion of its extent, a pair of conductive means embracing said dielectric means and positioned in spaced-apart coaxial relationship relative to each other, a metallic insert adapted to be movably accepted within said bore and being of sufficient length so as to extend outwardly beyond one end of said dielectric means, a pair of fastener elements each being an integral part of one of said conductive means and adapted to be accepted within a pair of spaced apertures in the work panel, a contact member fixed to one of said conductive means and electro-mechanically engaging the outwardly extending portion of said metallic insert, said dielectric means being a ceramic tube positioned with one end abutting one side of said panel, said embracing conductive means formed from a pair of split resilient metallic sleeves, one sleeve positioned adjacent said one end of the tube having its fastener element formed as a toe-like tab adapted to extend downwardly through an aperture in said panel and to engage the opposite side of said panel, the other sleeve positioned adjacent the opposite end of said tube having a flat spring arm extending outwardly and thence vertically downwardly, said arm interconnecting the second fastener element and said other sleeve and maintaining the spaced relation between the fastener elements, said second fastener element being arrowhead-shaped with opposite edges being bent in opposite directions to provide asymmetrically disposed shoulder means about the axis of said fastener elements, a narrow web interconnecting said arrowhead with said arm, said web being of lesser width than either said arm or said arrowhead thereby providing a pair of axially opposed shoulder means, said arm being twisted about its vertical axis in such a direction that it always urges the shoulders of the arrowhead into underlying engagement with the work panel.

3. A trimmer capacitor adapted to be mounted in upright position with one end abutting a continuous portion of one side of an apertured printed circuit panel and extending upwardly away therefrom including an elongated dielectric means having an axial bore through a portion of its extent, a pair of conductive means embracing said dielectric means and positioned in spaced apart coaxial relationship relative to each other, a metallic insert adapted to be movably accepted within the bore of said dielectric means and being of sufficient length so as to extend outwardly beyond a terminal end of said dielectric means removed from said panel, a pair of fastening elements, each being an integral part of one of said conductive means and adapted to be accepted within and removably engaged with a pair of spaced apertures in the complementary work panel, said fastening means serving to electrically contact and connect said capacitor to said complementary printed circuit panel, one of said fasteners including an L-shaped element and fastening means at one end thereof, said L-shaped element acting as a supporting element and conductor between the conductive means positioned nearest adjacent said terminal end of said dielectric means and said fastener means, a contact member integral with the same conductive means as said L-shaped means which electro mechanically engages the outwardly extending portion of said metallic insert, said metallic insert being a screw, said contact member including a pair of flat arms interconnected by a bight portion fixed to said conductive means, said arms being spaced apart a distance less than the diameter of said screw and substantially parallel, said arms further being twisted about their axes to present an edge bighting engagement with said screw when it is interposed therebetween, said arm edges engaging said screw under compression and creating a prevailing torque on said screw, whereby unintentional retrograde movement of said screw relative to the dielectric means is prevented and a positive electrical contact assured.

References Cited in the file of this patent

UNITED STATES PATENTS

| | | |
|---|---|---|
| 2,023,517 | Creager | Dec. 10, 1935 |
| 2,386,732 | Wohlheiter | Oct. 9, 1945 |
| 2,516,981 | Hall | Aug. 1, 1950 |
| 2,670,453 | Leuthold | Feb. 23, 1954 |
| 2,687,862 | Crowther | Aug. 31, 1954 |